US007595978B2

(12) United States Patent
Chen et al.

(10) Patent No.: US 7,595,978 B2
(45) Date of Patent: Sep. 29, 2009

(54) FLAT PANEL DISPLAY WITH UNIVERSAL ROTATION

(75) Inventors: Yung-Hsiang Chen, Miao-Li (TW); Che-Min Huang, Miao-Li (TW); Chun-Chien Chen, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 135 days.

(21) Appl. No.: 11/599,001

(22) Filed: Nov. 13, 2006

(65) Prior Publication Data

US 2007/0109734 A1 May 17, 2007

(30) Foreign Application Priority Data

Nov. 11, 2005 (TW) .............................. 94139741 A

(51) Int. Cl.
*G06F 1/16* (2006.01)

(52) U.S. Cl. ............................. 361/679.06; 361/679.22

(58) Field of Classification Search ................. 361/681, 361/683

See application file for complete search history.

(56) References Cited

U.S. PATENT DOCUMENTS 4,919,387 A * 4/1990 Sampson .................... 248/371
5,870,280 A * 2/1999 Cho ........................... 361/681
6,437,975 B1 * 8/2002 Huang ........................ 361/681
6,484,994 B2 * 11/2002 Hokugoh .................... 248/371
6,510,049 B2 * 1/2003 Rosen ........................ 361/681
6,822,857 B2 * 11/2004 Jung et al. .................. 361/681
7,068,497 B2 6/2006 Chu
7,286,342 B2 * 10/2007 Yang .......................... 361/681
7,384,019 B2 * 6/2008 Choi .......................... 248/136
7,434,774 B1 * 10/2008 Floersch et al. .......... 248/183.2
2002/0053629 A1 * 5/2002 Hokugoh .................... 248/371
2004/0008476 A1 * 1/2004 Cheng ........................ 361/681
2004/0012917 A1 * 1/2004 Jung et al. .................. 361/681
2006/0032998 A1 * 2/2006 Depay ..................... 248/291.1
2007/0121280 A1 * 5/2007 Yang .......................... 361/681

* cited by examiner

*Primary Examiner*—Jayprakash N Gandhi
*Assistant Examiner*—Anthony Q Edwards
(74) *Attorney, Agent, or Firm*—Wei Te Chung

(57) ABSTRACT

An exemplary flat panel display (1) includes a main body (10), a neck (11), and a base (12). The main body includes a chassis (17). The neck is connected with the chassis by a first pivot structure such that the main body can be rotated back and forth about a substantially horizontal axis. The base is connected with the neck by a second pivot structure such that the neck can be rotated left and right about a substantially vertical axis.

14 Claims, 8 Drawing Sheets

FLAT PANEL DISPLAY WITH UNIVERSAL ROTATION

FIELD OF THE INVENTION

The present invention relates to flat panel displays (FPDs), and more particularly to a flat panel display with universal rotation.

GENERAL BACKGROUND

Flat panel displays are commonly used as display devices for compact electronic apparatuses. Referring to FIG. 8, a typical flat panel display 8 includes a main body 80, a neck 82, and a base 84. The neck 82 is integrally formed with the base 84, and is connected with the main body 80 by a pivot structure 86. The main body 80 can be rotated back or forth through a range of angles defined in a vertical plane. The flat panel display 8 further includes a video graphics array (VGA) data line 87 and a power line 88, which are connected with a back of the main body 80. Typically, the VGA data line 87 and the power line 88 dangle down from the main body 80 across the neck 82 and the base 84.

In use, if an operator wants to adjusts a viewing angle of the main body 80 by rotating the main body 80 left or right, the operator must turn the base 84 together with main body 80. This can be troublesome and inconvenient. Further, the exposure of the VGA data line 87 and the power line 88 at the back of the flat panel display 8 may be rather unsightly.

What is needed, therefore, is a flat panel display that can overcome the above-described deficiencies.

SUMMARY

An exemplary flat panel display includes a main body, a neck, and a base. The main body includes a chassis. The neck is connected with the chassis by a first pivot structure such that the main body can be rotated back and forth about a substantially horizontal axis. The base is connected with the neck by a second pivot structure such that the neck can be rotated left and right about a substantially vertical axis.

Other aspects, advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the described embodiments. In the drawings, like reference numerals designate corresponding parts throughout various views, and all the views are schematic.

DETAILED DESCRIPTION OF PREFERRED EMBODIMENTS

Reference will now be made to the drawings to describe the preferred embodiments in detail.

Figure 1:
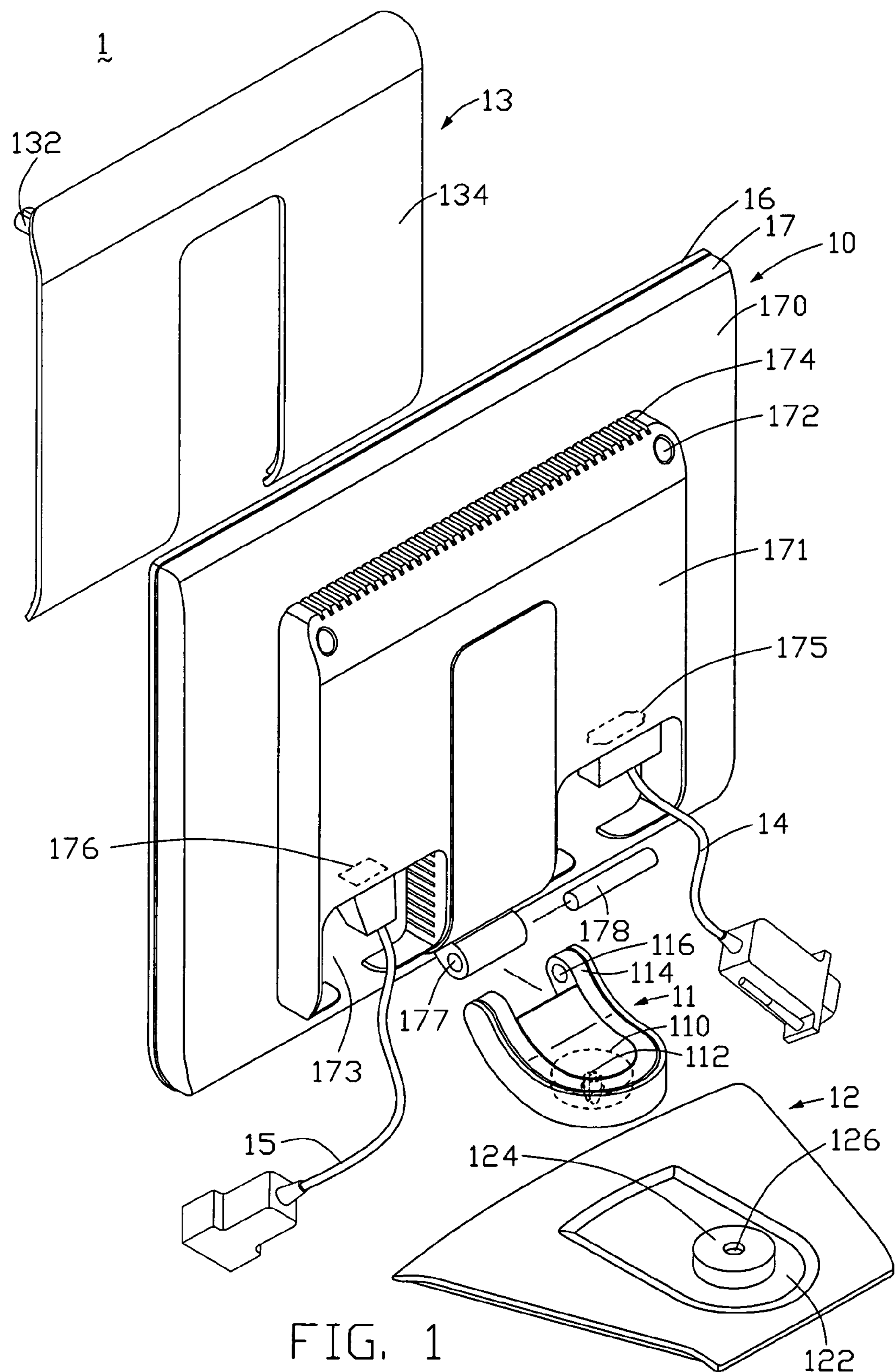
FIG. 1 is an exploded, isometric view of a flat panel display according to a first embodiment of the present invention, the flat panel display including a main body, a neck, and a base.

Referring to FIG. 1, a flat panel display 1 according to a first embodiment of the present invention is shown. The flat panel display 1 includes a main body 10, a neck 11, a base 12, a plaque 13, a VGA data line 14, and a power line 15.

Figure 2:
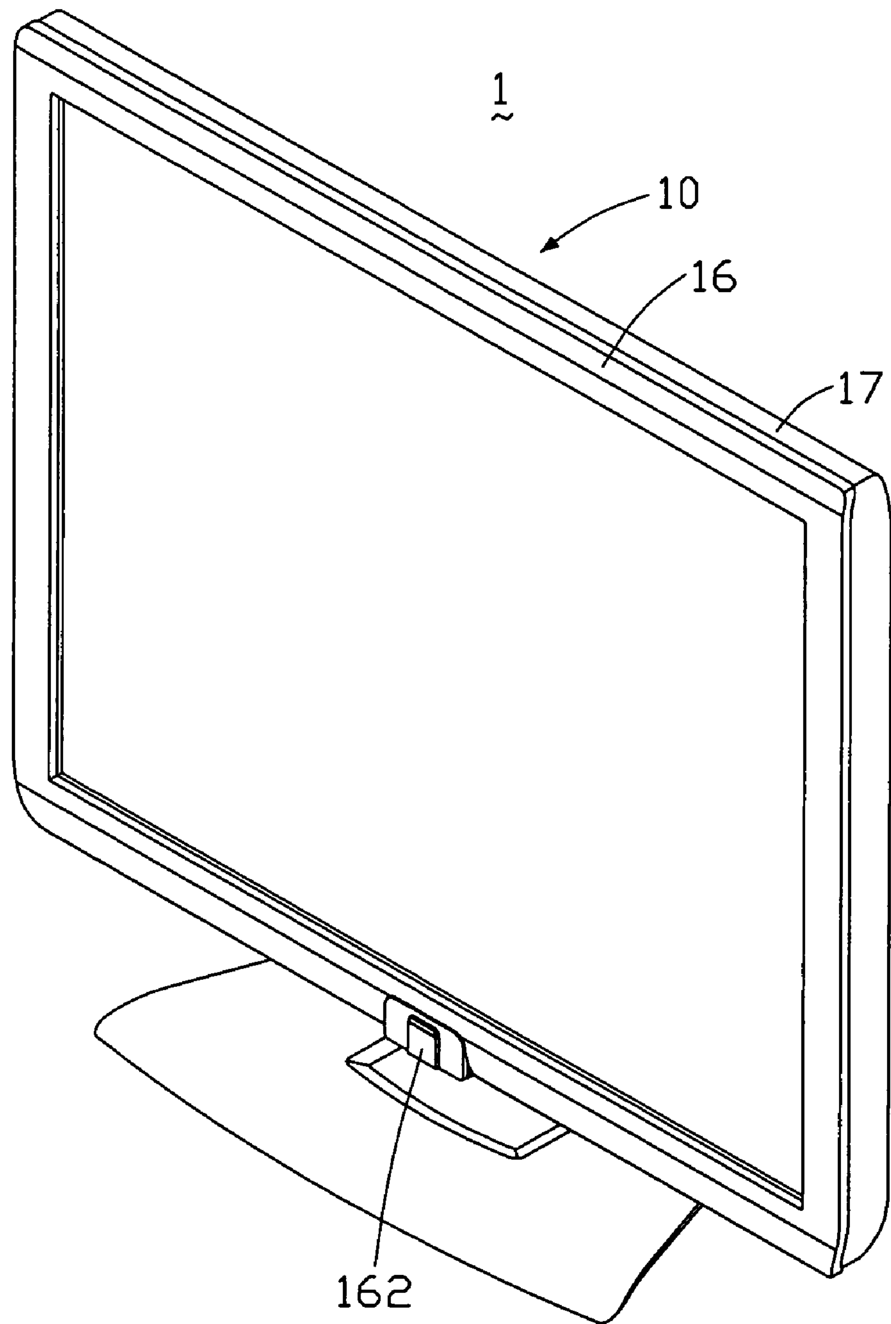
FIG. 2 is an isometric, front view of the flat panel display of FIG. 1 fully assembled, showing the base supporting the main body via the neck (not visible).

Referring also to FIG. 2, the main body 10 has a generally rectangular shape, and includes a front frame 16, and a back chassis 17 engaged with the front frame 16. The front frame 16 is rectangular, and defines a window (not labeled) for viewing a display panel (not shown) of the flat panel display 1. The front frame 16 includes a control button 162 at a middle portion of a lower wall (not labeled) thereof. In the illustrate embodiment, the control button 162 is square, and is made from aluminum.

The back chassis 17 includes a rectangular tray 170, and a central jutting back wall 171 outwardly extending from the tray 170. The back wall 171 defines two locating holes 172, two recesses 173, and a plurality of radiation grooves 174. The locating holes 172 are located at two opposite upper corners (not labeled) of the back wall 171. The recesses 173 are located at two opposite lower corners (not labeled) of the back wall 171. A first hatch 175 and a second hatch 176 are respectively defined in portions of the back wall 171 that bound top extremities of the recesses 173. The first hatch 175 and the second hatch 176 respectively correspond to a VGA socket (not shown) and a power socket (not shown) of the flat panel display 1. The radiation grooves 174 are located along a topmost portion of the back wall 171, at a level slightly above the locating holes 172. The back wall 171 further includes a hub 177, and a spindle 178. The hub 177 is located at a bottommost portion of the back wall 171, generally between the first and second hatches 175, 176. The spindle 178 can be fittingly received in the hub 177.

The plaque 13 has a shape corresponding to contours of the back wall 171. The plaque 13 includes two locating protrusions 132 (only one visible), and two main plate portions 134. The locating protrusions 132 respectively correspond to the locating holes 172. The main plate portions 134 cover major portions of the back wall 171 including the recesses 173, respectively. The base 12 is generally a trapezoidal platform, and defines a central pan 122 thereat. A short cylinder 124 extends up from a bottom of the pan 122. A first blind hole 126 is defined in the cylinder 124.

The neck 11 is a generally solid structure with a generally U-shaped profile, the generally U-shaped profile being defined by a generally semicircular central portion lying in a horizontal plane and two curved portions each lying in a vertical plane. The curved portions bend up gradually from opposite ends of the central portion. That is, proximal ends of the curved portions at the central portion are substantially horizontal, and distal end ears 114 of the curved portions are oriented obliquely to the horizontal plane. A bottom of the neck 11 at the central portion defines a round cavity 110 therein, corresponding to the cylinder 124. The neck 11 also includes a block 112. The block 112 is located in the cavity 110, and corresponds to the first blind hole 126. In the illustrated embodiment, the block 112 has a bifurcated snap-lock structure. The ears 114 protrude up from a main body of the neck 11. A distance between the ears 114 corresponds to a length of the hub 177. One of the ears 114 defines a through hole 116 corresponding to the spindle 178, and the other ear 114 defines a second blind hole (not visible) therein.

Figure 3:
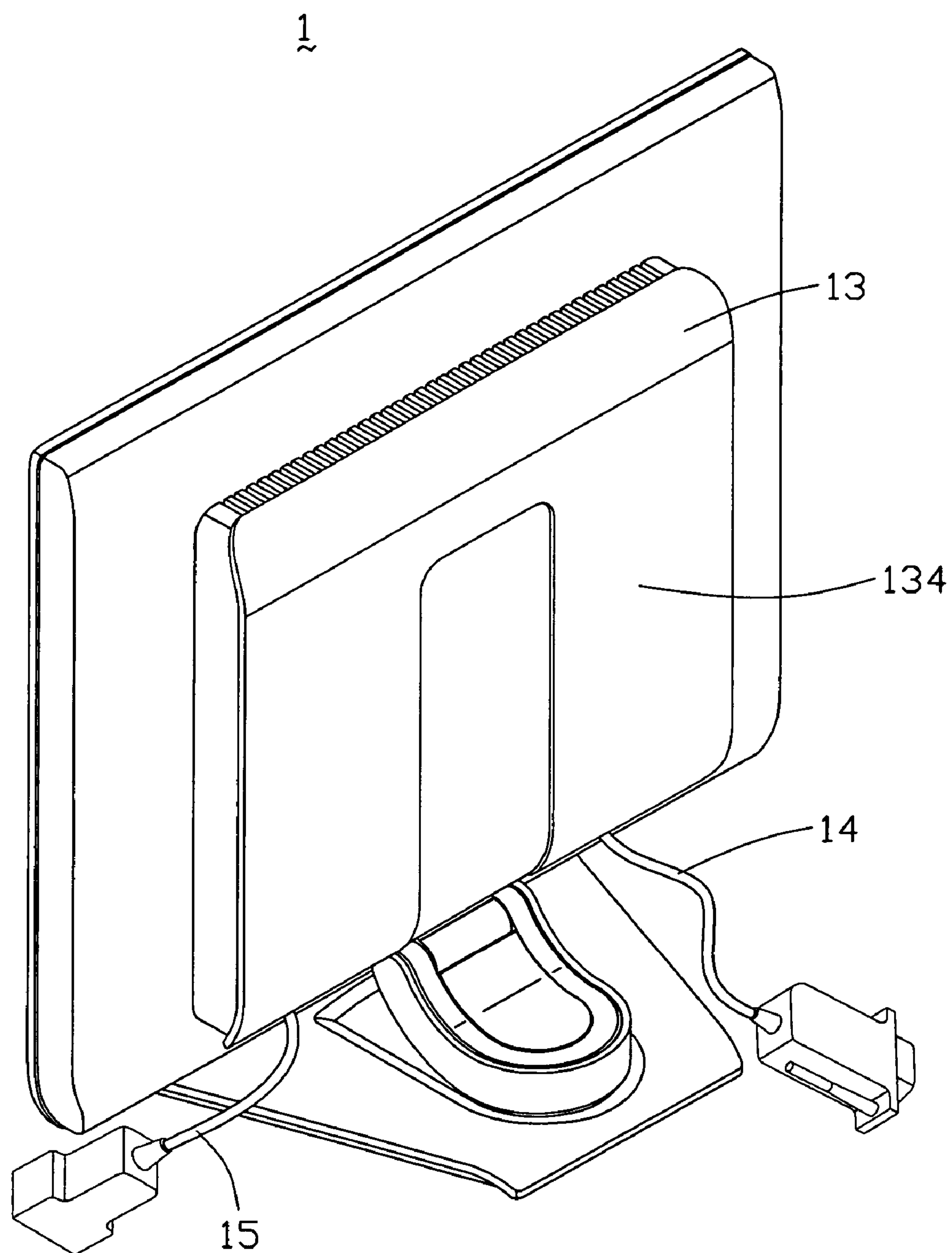
FIG. 3 is an isometric, back view of the flat panel display of FIG. 1 fully assembled, showing the base supporting the neck and the main body.
Figure 4:
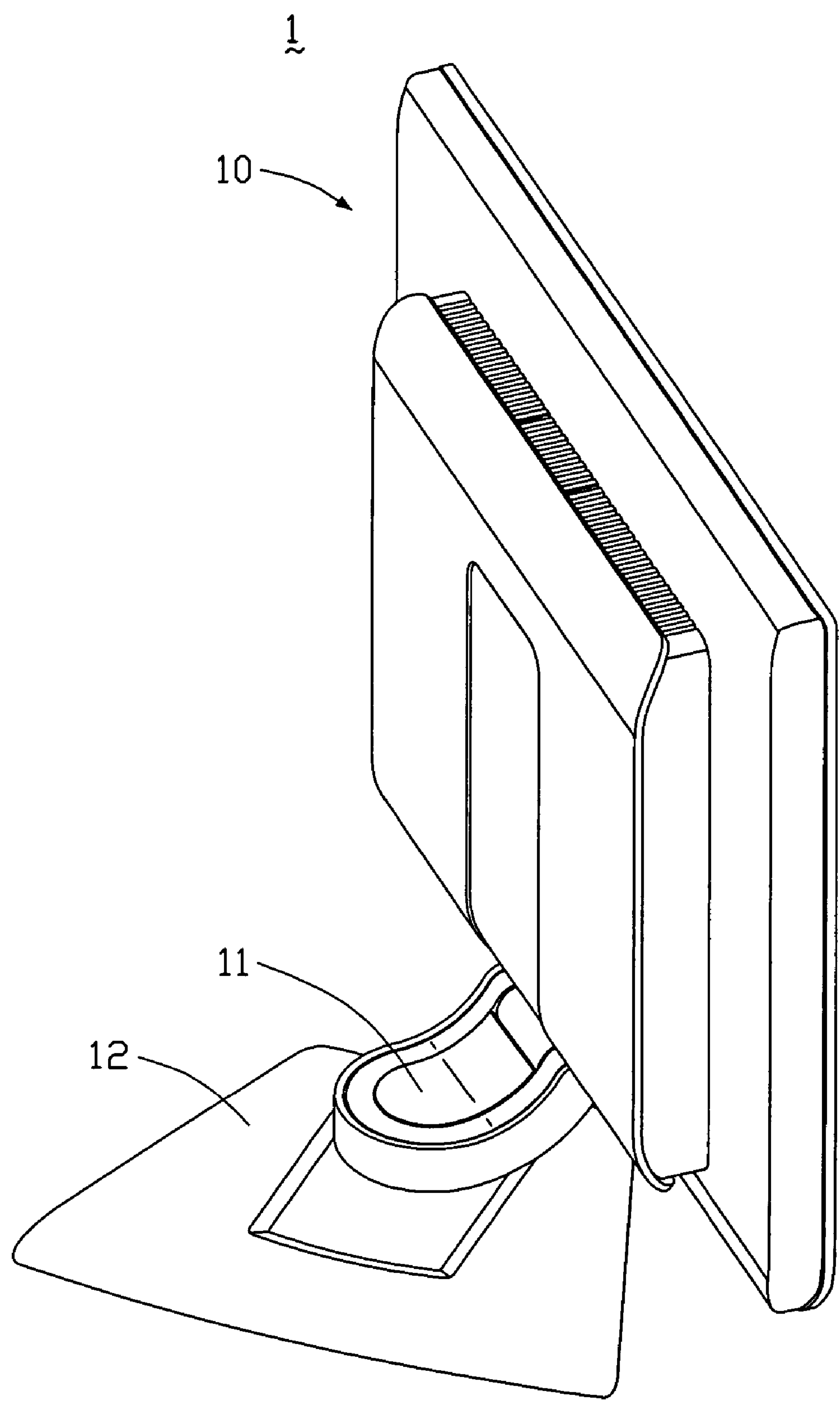
FIG. 4 is similar to FIG. 2, but showing the main body and the neck having been rotated relative to the base.

Referring also to FIG. 3, when the flat panel display 1 is assembled, one portion of the VGA data line 14 and one portion of the power line 15 are respectively received in the recesses 173. The locating holes 172 of the back wall 171 receive the locating protrusions 132 of the plaque 13 respectively. Thus, the back wall 171 is largely covered by the plaque 13, with the recesses 173 being covered by the main plate portions 134 of the plaque 13, respectively. That is, said portions of the VGA data line 14 and the power line 15 are covered by the main plate portions 134. Therefore, the VGA data line 14 and the power line 15 are orderly arranged at the back wall 171. The ears 114 of the neck 11 are located adjacent two ends (not labeled) of the hub 177. The spindle 178 is extended through the through hole 116 of said one of the ears 114, the hub 177, and the second blind hole. Thus, the main body 10 is connected with the neck 11 by a first pivot structure (not labeled) formed by the hub 177, the spindle 178 and the ears 114. The spindle 178 is parallel to the tray 170 and the base 12. The main body 10 can be rotated back and forth about the spindle 178 through a desired range of angles. Similarly, the base 12 can be rotated up about the spindle 178. The cylinder 124 is received in the cavity 110 of the neck 11, with the first blind hole 126 thereof receiving the block 112. Thus, the neck 11 is connected with the base 12 by a second pivot structure (not labeled) formed by the cylinder 124, the block 112, and the cavity 110. The neck 11 can be rotated about the cylinder 124 from right to left or from left to right through a desired range of angles. That is, referring also to FIG. 4, the main body 10 connected with the neck 11 can likewise be rotated about an axis of the cylinder 124. Therefore, when an operator wants to adjust a viewing angle of the main body 10 left or right, this can be done without having to move the base 12 also. That is, the adjustment of the viewing angle is convenient.

Figure 5:
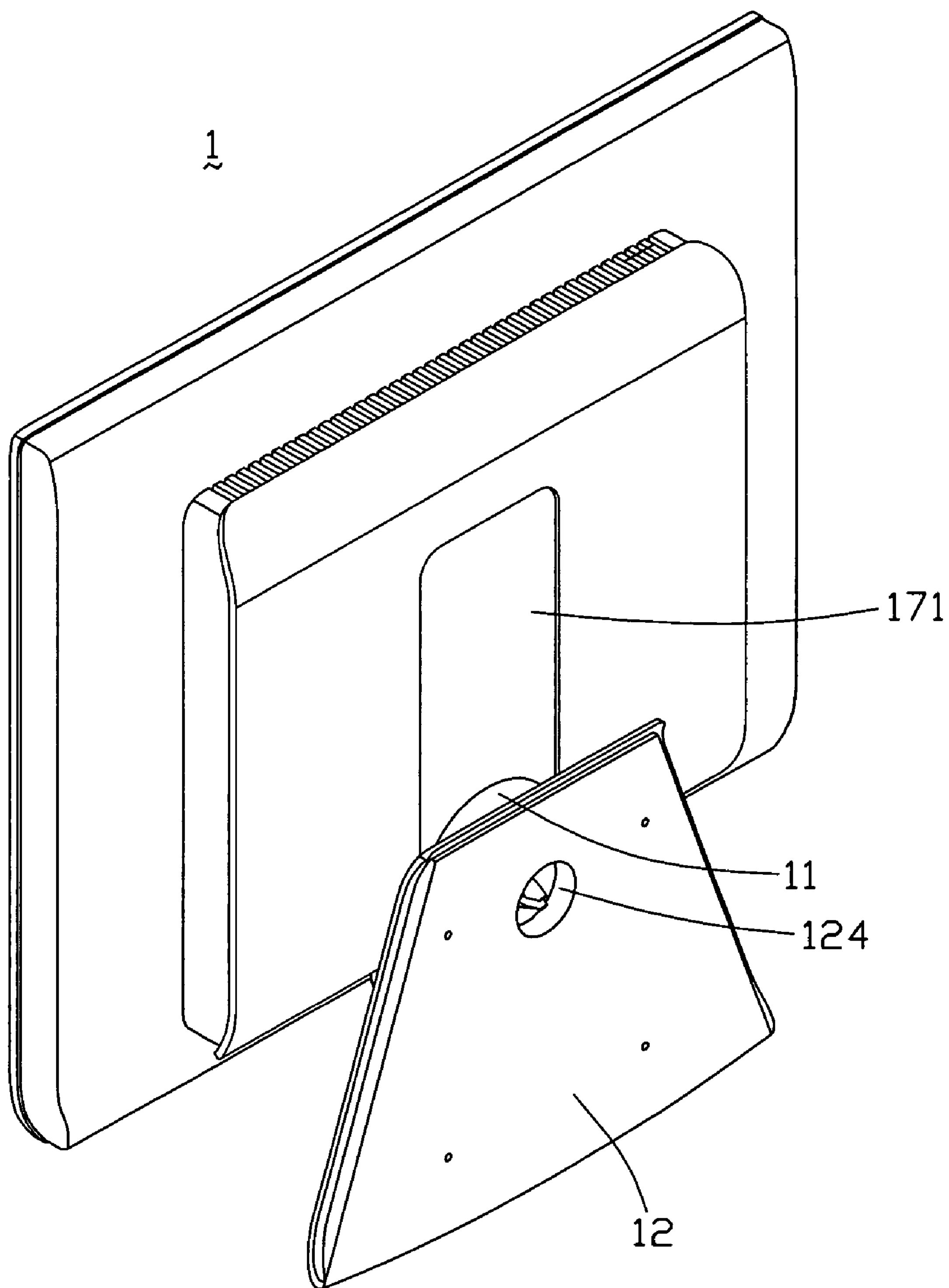
FIG. 5 is similar to FIG. 3, but showing the base and the neck having been rotated up so that the base is parallel to the main body.
Figure 6:
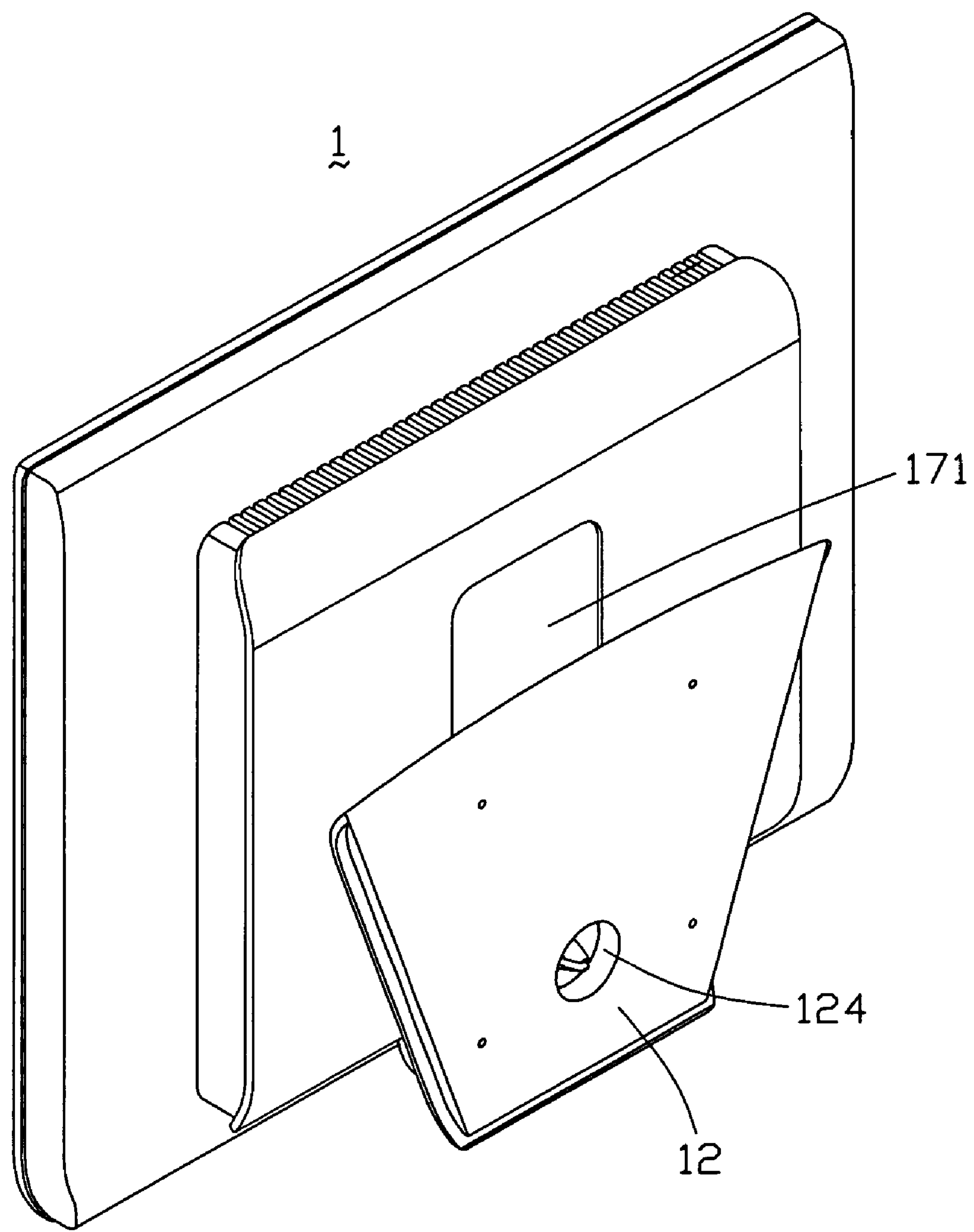
FIG. 6 is similar to FIG. 5, but showing the base having been rotated 180° relative to the neck.

Referring also to FIG. 5, the neck 11 has a shape corresponding to the contour of an adjacent portion (not labeled) of the back wall 171, and the neck 11 and the base 12 can be rotated together about the spindle 178. That is, the neck 11 together with the base 12 can be rotated close to the back wall 171, so that the flat panel display 1 is compact for transportation or storage. Referring also to FIG. 6, the base 12 can be further rotated, this time 180° about the cylinder 124. In this position, the flat panel display 1 is even more compact, with the whole base 12 located parallel to and behind the back wall 171.

With the above-described configuration, the flat panel display 1 can be conveniently used and have a neat overall appearance. Further, the flat panel display 1 can be readily folded into a compact configuration. This makes it convenient and inexpensive to pack and transport the flat panel display 1.

Figure 7:
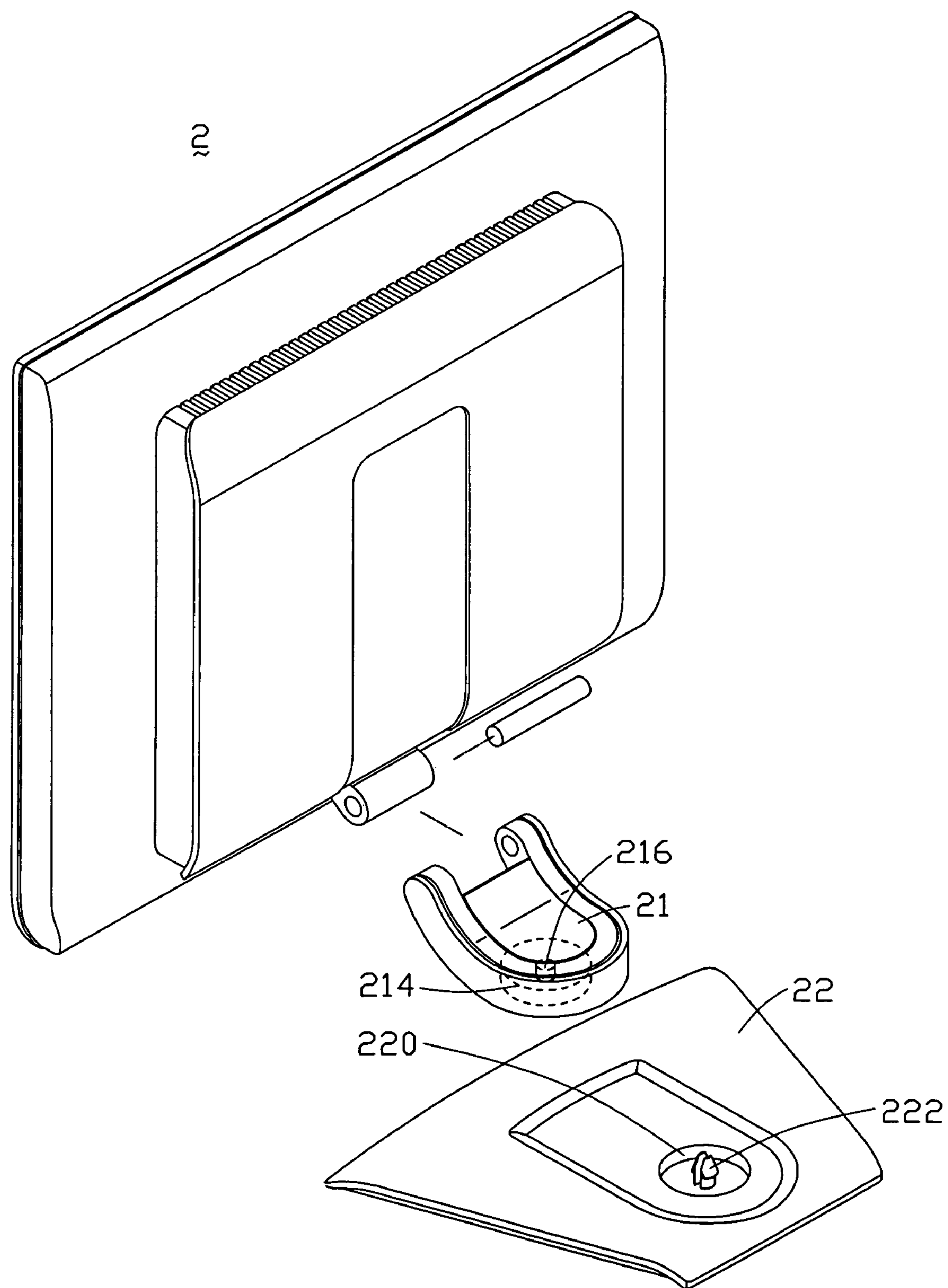
FIG. 7 is an exploded, isometric view of a flat panel display according to a second embodiment of the present invention.
Figure 8:
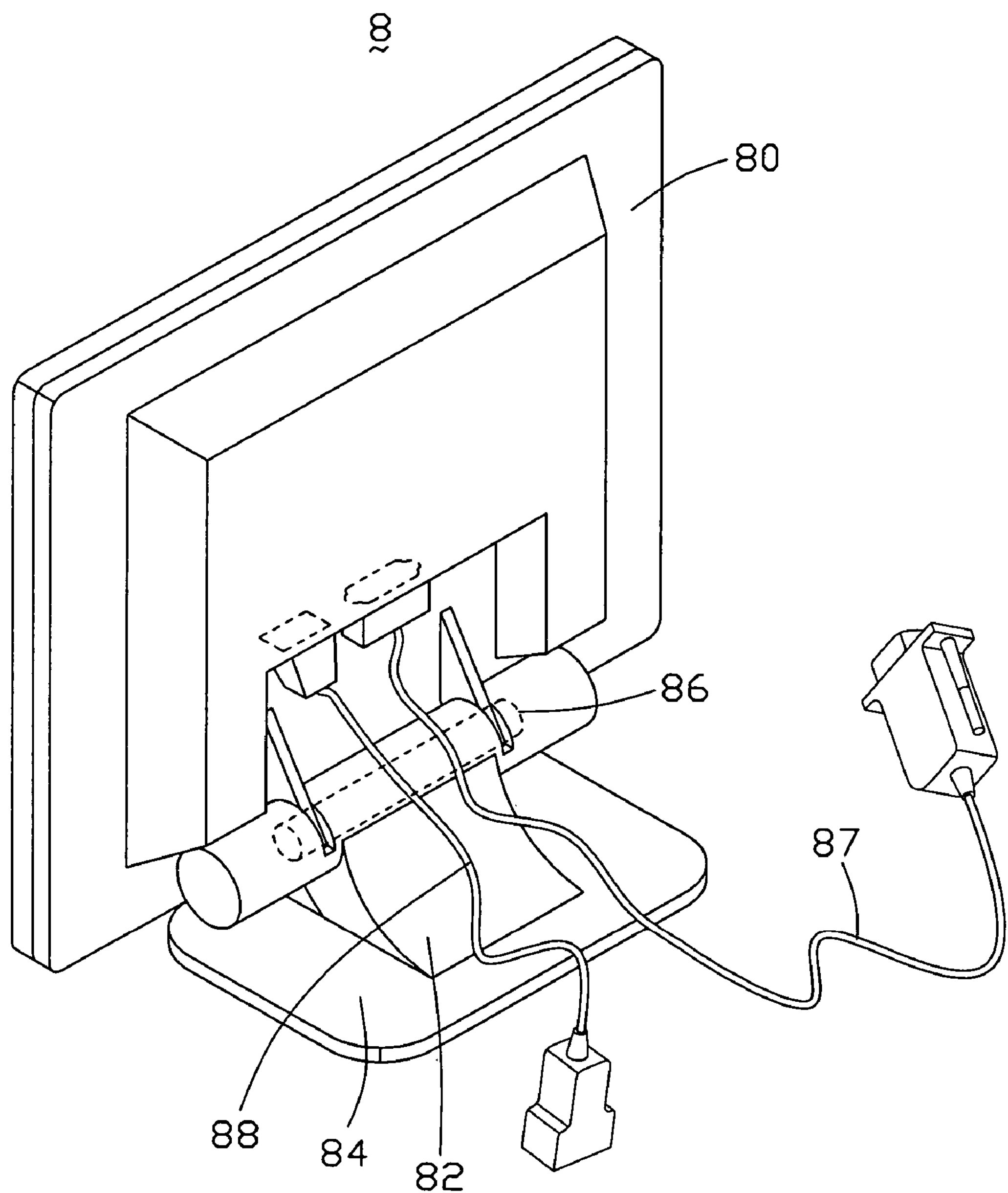
FIG. 8 is an isometric view of a conventional flat panel display.

Referring to FIG. 7, a flat panel display 2 according to a second embodiment of the present invention is shown. The flat panel display 2 is similar to the flat panel display 1. However, the flat panel display 2 includes a neck 21 and a base 22. The neck 21 includes a bottom cylinder 214, with a hole 216 defined in the cylinder 214. The base 12 defines a cavity 220, and has a block 222 extending up into the cavity 220. The cylinder 214 is rotatably received in cavity 220, with the block 222 correspondingly being received in the hole 216. The flat panel display 2 can achieve advantages similar to those of the flat panel display 1.

Further or alternative embodiments may include the following. In one example, the block 112 can have a triangular shape, a cylindrical shape, or a polygonal shape. In another example, the control button 162 can be made from copper, iron, steel, or a suitable alloy.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A flat panel display comprising:

a main body comprising a chassis;

a neck connected with the chassis by a first pivot structure such that the main body can be rotated back and forth about a substantially horizontal axis; and a base connected with the neck by a second pivot structure such that the neck can be rotated left and right about a substantially vertical axis;

wherein when the neck is rotated behind the chassis, the whole base is able to be rotated behind the chassis, such that the flat panel display can be readily folded into a compact configuration; and the second pivot structure comprises a cylinder provided on one of the base and the neck, a hole defined in the cylinder, a cavity provided in the other of the base and the neck, a block located in the cavity, with the cylinder rotatably received in the cavity, and the block received in the hole.

2. The flat panel display in claim 1, wherein the chassis comprises a tray and a central jutting back wall outwardly extending from the tray.

3. The flat panel display in claim 2, wherein the back wall defines two recesses.

4. The flat panel display in claim 3, further comprising a video graphics array data line and a power line partly received in the recesses respectively.

5. The flat panel display in claim 4, further comprising a plaque covering at least part of the back wall.

6. The flat panel display in claim 5, wherein the plaque comprises two main plate portions covering the recesses respectively, with the video graphics array data line and the power line orderly arranged at the back wall, such that the flat panel display has a neat overall appearance.

7. The flat panel display in claim 1, wherein the cylinder is provided on the base, and the cavity is provided in the neck.

8. The flat panel display in claim 1, wherein the cylinder is provided on the neck, and the cavity is provided in the base.

9. The flat panel display in claim 1, wherein the main body further comprises a front frame attached to the chassis.

10. The flat panel display in claim 9, wherein the front frame comprises a control button at a bottom portion thereof.

11. The flat panel display in claim 10, wherein the control button is made from aluminum, copper, iron, steel, or alloy.

12. The flat panel display in claim 1, wherein the neck extends in an oblique manner, the neck having the substantially horizontal axis located at an upper end thereof and the substantially vertical axis located at a lower end thereof.

13. The fiat panel display in claim 12, wherein the neck has a generally U-shaped profile defined by a generally semicircular central portion and two portions that bend up from opposite ends of the central portion, the substantially horizontal axis being located at upper ends of said two portions, and the substantially vertical axis being located in a middle of the central portion.

14. The flat panel display in claim 12, wherein most portions of the neck are sandwiched between the main body and the base when both the main body and the base are oriented in a vertical direction.

* * * * *